United States Patent
Yoshida et al.

(10) Patent No.: US 7,867,670 B2
(45) Date of Patent: Jan. 11, 2011

(54) FUEL TANK AND FUEL CELL SYSTEM INCLUDING THE SAME

(75) Inventors: Yasuki Yoshida, Suwon-si (KR); Do-Young Kim, Suwon-si (KR); Seong-Kee Yoon, Suwon-si (KR); Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/247,148

(22) Filed: Oct. 7, 2008

(65) Prior Publication Data

US 2009/0110976 A1 Apr. 30, 2009

(30) Foreign Application Priority Data

Oct. 30, 2007 (KR) .................. 10-2007-0109497

(51) Int. Cl.
 *H01M 2/14* (2006.01)
(52) U.S. Cl. ....................... 429/516; 429/515
(58) Field of Classification Search ............... None
See application file for complete search history.

(56) References Cited

U.S. PATENT DOCUMENTS

| | | | | |
|---|---|---|---|---|
| 4,865,925 A | * | 9/1989 | Ludwig et al. ............... | 429/12 |
| 2004/0048116 A1 | | 3/2004 | Ord et al. | |
| 2006/0269470 A1 | | 11/2006 | Zhang et al. | |

FOREIGN PATENT DOCUMENTS

| | | |
|---|---|---|
| EP | 1 396 472 A2 | 3/2004 |
| JP | 5-137979 | 6/1993 |
| JP | 2006-314944 | 11/2006 |
| KR | 10-2004-0084647 | 10/2004 |
| KR | 10-2008-0014868 | 2/2008 |
| WO | WO 2004/105171 A2 | 12/2004 |
| WO | WO 2006/135896 A2 | 12/2006 |
| WO | WO 2007/120942 A2 | 10/2007 |

OTHER PUBLICATIONS

European Search Report dated May 29, 2009, for corresponding European application 08253565.9, noting listed references in this IDS.
SIPO Office action dated Jul. 5, 2010, for corresponding Chinese Patent application 200810170318.9, noting listed reference in this IDS, as well as WO 2006/135896, previously filed in an IDS dated Aug. 21, 2009.
European Search Report dated Oct. 13, 2010, for corresponding European Patent application 08256565.9.

* cited by examiner

*Primary Examiner*—Dah-Wei D Yuan
*Assistant Examiner*—Maria J Laios
(74) *Attorney, Agent, or Firm*—Christie, Parker & Hale, LLP

(57) ABSTRACT

A fuel cell system for generating electrical energy by a chemical reaction between a fuel and an oxidizing agent. In exemplary embodiments of the present invention, by using a hydrophobic porous membrane, an alkaline material such as sodium that is generated together with hydrogen gas in a hydrolysis reaction of a metal hydride compound can be eliminated effectively.

13 Claims, 4 Drawing Sheets

FUEL TANK AND FUEL CELL SYSTEM INCLUDING THE SAME

CROSS-REFERENCE TO RELATED APPLICATION

This application claims priority to and the benefit of Korean Patent Application No. 10-2007-0109497, filed in the Korean Intellectual Property Office on Oct. 30, 2007, the entire content of which is incorporated herein by reference.

BACKGROUND OF THE INVENTION

1. Field of the Invention

The present invention relates to a fuel cell system for generating electrical energy by an electrochemical reaction between a fuel and an oxidizing agent. More particularly, the present invention relates to a fuel tank and a fuel cell system including the fuel tank.

2. Description of the Related Art

Fuel cells form an electricity generating system for generating electrical energy using an oxidation reaction of a fuel and a reduction reaction of an oxidizing agent gas. Fuel cells can be categorized as polymer electrolyte membrane fuel cells or direct oxidation membrane fuel cells according to the type of the fuel they use. In a polymer electrolyte membrane fuel cell, a fuel processing apparatus, such as a reformer, reforms a fuel into hydrogen gas, and the hydrogen gas is supplied to a stack. In a direct oxidation fuel cell, unlike in the polymer electrolyte membrane fuel cell, a fuel such as methanol (rather than hydrogen gas) is directly supplied to a stack.

In fuel cells, the hydrogen gas may be generated by a fuel reforming reaction. Also, the hydrogen gas may be generated by hydrolyzing a metal hydride compound. A fuel cell using the metal hydride compound and according to a first conventional embodiment has a structure where catalysts are added to a fuel solution that is a mixture of a metal hydride compound and water. A fuel cell using the metal hydride compound and according to a second conventional embodiment has a structure where the metal hydride compound and the water are supplied into a reaction container in which catalysts are stored. A fuel cell using the metal hydride compound and according to a third conventional embodiment has a structure where a catalytic solution is supplied into a reaction container in which the metal hydride compound is stored.

A fuel including sodium borohydride ($NaBH_4$) may be used for the fuel cell using the metal hydride compound. During a hydrolysis reaction of the sodium borohydride ($NaBH_4$), an alkaline material such as sodium is generated, as well as the hydrogen gas. If the alkaline material such as sodium is provided to a fuel cell stack together with the hydrogen gas, the output voltage of the generated electrical energy is deteriorated as shown in FIG. 8. Referring to FIG. 8, the deterioration of the output voltage of the fuel cell increases as the amount of the alkaline material such as sodium increases. In addition, the deterioration becomes worse as time passes. This is because the alkaline material such as sodium is adhered to a polymer electrolyte membrane such as Nafion disposed in the stack, and prevents (or blocks) an electrochemical reaction between the hydrogen gas and oxidizing agent gas.

As such, in a conventional fuel cell using the metal hydride compound, research to eliminate the alkaline material such as sodium that is generated together with the hydrogen gas has been made.

In Japanese Patent Laid-Open Publication No. 05-137979, a hydrogen separator is disposed in order to eliminate the alkaline material such as sodium. The hydrogen separator is formed of a Pd sheet or a Pd alloy sheet. However, since Pd metal is expensive, it is difficult to commercialize the fuel cell using the Pd sheet or Pd alloy sheet.

In Japanese Patent Laid-Open Publication No. 2006-314944, a polyimide membrane as a hydrogen separator is disposed in order to eliminate the alkaline material such as sodium that is generated together with the hydrogen gas. However, the polyimide membrane is chemically and/or structurally weak with respect to a chemical reagent such as an alkaline solution, and hydrogen separating speed of the polyimide membrane is low.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of an embodiment of the present invention is directed toward a fuel tank and a fuel cell system including the fuel tank for effectively eliminating an alkaline material such as sodium that is generated together with the hydrogen gas in a hydrolysis reaction.

A fuel cell according to an exemplary embodiment of the present invention includes at least one hydrogen supplier, at least one electricity generator (or generating unit), and at least one hydrophobic porous membrane. The at least one hydrogen supplier is for generating hydrogen gas from a fuel and for supplying the hydrogen gas through at least one gas passage. The at least one electricity generator is for generating electrical energy by reacting the hydrogen gas supplied from the at least one hydrogen supplier with an oxidizing agent gas. The at least one hydrophobic porous membrane is on the at least one gas passage.

The at least one hydrophobic porous membrane may include a first hydrophobic porous membrane and a second hydrophobic porous membrane disposed between the first hydrophobic porous membrane and the at least one electricity generator. A pore size of the first hydrophobic porous membrane may be larger than a pore size of the second hydrophobic porous membrane.

The pores of the first hydrophobic porous membrane may have an average diameter of about 0.1 μm to about 0.5 μm, and the pores of the second hydrophobic porous membrane may have an average diameter of about 0.1 μm to about 0.2 μm.

The fuel may be a metal hydride compound, and the hydrogen supplier may generate the hydrogen gas by a hydrolysis reaction of the metal hydride compound.

The metal hydrogen compound may be sodium borohydride ($NaBH_4$).

The at least one fuel supplier may include at least one fuel tank for generating the hydrogen gas and discharging the hydrogen gas though at least one gas outlet of the at least one fuel tank, and the at least one hydrophobic porous membrane may be disposed on the at least one outlet of the at least one fuel tank where the at least one gas passage is connected.

A fuel tank of a fuel cell according to an exemplary embodiment of the present invention includes at least one body, at least one reaction space, at least one gas outlet, and at least one hydrophobic porous membrane. The at least one reaction space is provided in the at least one body and is for generating hydrogen gas by a hydrolysis reaction between a fuel and a solution. The at least one gas outlet is formed on the at least one body, and the hydrogen gas is discharged through the at least one gas outlet. The at least one hydrophobic porous membrane is disposed on the at least one gas outlet.

The at least one gas outlet may be disposed on an upper portion of the at least one reaction space.

The at least one hydrophobic porous membrane may include a first hydrophobic porous membrane disposed on an inner side of the at least one gas outlet, and a second hydrophobic porous membrane disposed on an outer side of the at least one gas outlet.

A water solution or an acid solution may be filled in a discharging space between the first hydrophobic porous membrane and the second hydrophobic porous membrane.

A porous material for absorbing the water solution or the acid solution may be disposed in the discharging space between the first hydrophobic porous membrane and the second hydrophobic porous membrane.

In the fuel cell system according to the exemplary embodiments of the present invention, an alkaline material such as sodium that is generated together with hydrogen gas during a hydrolyzing reaction can be effectively eliminated. Accordingly, the fuel cell system according to the exemplary embodiments of the present invention can stably generate electrical energy for a time longer than a conventional fuel cell system.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
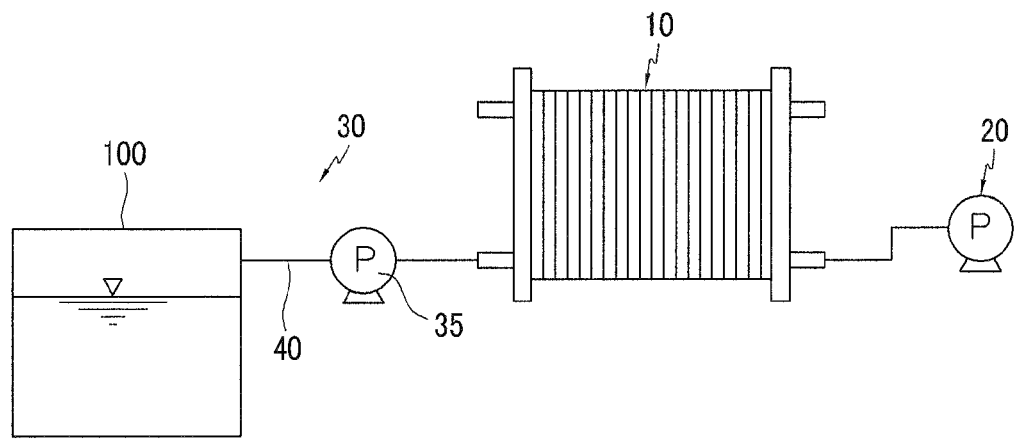
FIG. 1 is a schematic diagram of a fuel cell system according to an exemplary embodiment of the present invention.

FIG. 1 is a schematic diagram of a fuel cell system according to an exemplary embodiment of the present invention.

As shown in FIG. 1, the fuel cell system of the present exemplary embodiment generates hydrogen gas from a fuel by a hydrolysis reaction of a metal hydride compound, and generates electrical energy by reacting the hydrogen gas with oxidizing agent gas. Particularly, the fuel cell system of the present exemplary embodiment has a structure so that an alkaline material such as sodium that is generated together with hydrogen gas during the hydrolyzing reaction of the metal hydride compound can be eliminated. For the above, the fuel cell system of the present exemplary embodiment has the following structure.

An electricity generating unit (or electricity generator) 10 generates electrical energy by reacting the hydrogen gas with the oxidizing agent gas. The electricity generating unit 10 includes one or more unit cells, which are the minimum units for inducing an electrochemical reaction between the hydrogen gas and the oxidizing agent gas. Each unit cell includes a membrane-electrode assembly (MEA), and a separator disposed at either side of the membrane-electrode assembly. The electricity generating unit 10 has a stacked structure in which a plurality of unit cells are consecutively stacked to each other. Here, the stacked structure of the unit cells can be referred to as a stack.

An oxidizing agent supplier 20 is connected to the electricity generating unit 10 and supplies the oxidizing agent gas, such as air, to the electricity generating unit 10. The oxidizing agent supplier 20 may be an air pump. However, in one embodiment, since the electricity generating unit 10 can use external air directly, the oxidizing agent supplier 20 is not necessarily included.

A hydrogen supplier 30 generates hydrogen gas from a fuel, and supplies the hydrogen gas to the electricity generating unit 10 through a gas passage.

The hydrogen supplier 30 includes a fuel tank 100. The fuel tank 100 will be described in more detail later, with reference to FIG. 2.

The hydrogen supplier 30 may further include a pump 35. However, a pump may not be included in the hydrogen supplier 30 according to an embodiment of the fuel cell system. That is, in one embodiment, the hydrogen gas may flow from the fuel tank 100 into the electricity generating unit 10 without a pump.

Here, the gas passage 40 may be any suitable passage(s) to provide the hydrogen gas and byproducts generated in the fuel tank 100. In the exemplary embodiment, the gas passage 40 connects the fuel tank 100 to the electricity generating unit 10.

In the exemplary embodiment of FIG. 1, at least one hydrophobic porous membrane is disposed on the gas passage 40, and thus the hydrogen gas passes through the at least one hydrophobic porous membrane when the hydrogen gas is supplied to the electricity generating unit 10. In the exemplary embodiment of FIG. 1, the at least one hydrophobic porous membrane is disposed on the gas passage 40 sequentially along a propagation direction of the gas. Here, the hydrophobic porous membrane is a thin membrane having characteristics in that it does not absorb water and is not soluble in water. The hydrophobic porous membrane separates a liquid and a gas, and has a plurality of pores with a set (or predetermined) size for selectively passing a gas having a size that is smaller than the set (or predetermined) size of the plurality of pores. Accordingly, the hydrophobic porous membrane separates the liquid and the gas, and selectively blocks an alkaline material included in the vapor by the pore sizes thereof. In the present exemplary embodiment, the hydrophobic porous membrane may be disposed on an outlet of the fuel tank where the gas passage 40 is connected. Hereinafter, this will be described more fully with reference to FIGS. 2 to 6.

Figure 2:
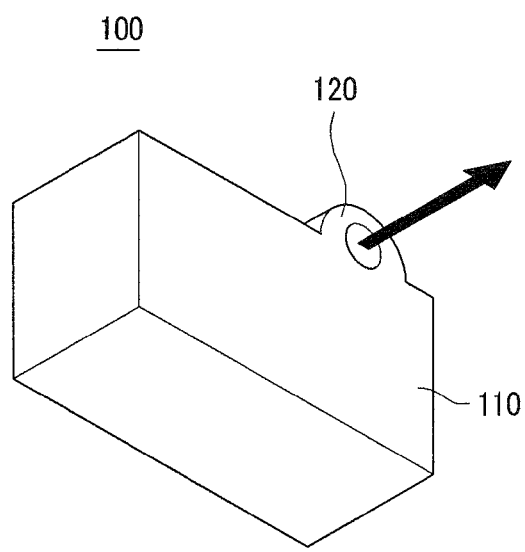
FIG. 2 is a perspective schematic view of a fuel tank shown in FIG. 1.

FIG. 2 is a perspective schematic view of the fuel tank 100 shown in FIG. 1.

As shown in FIG. 2, a body 110 of the fuel tank 100 has a substantially hexahedral shape, and a gas outlet 120 for discharging the hydrogen gas to the gas passage 40 is disposed on an upper portion of the body 110.

Figure 3:
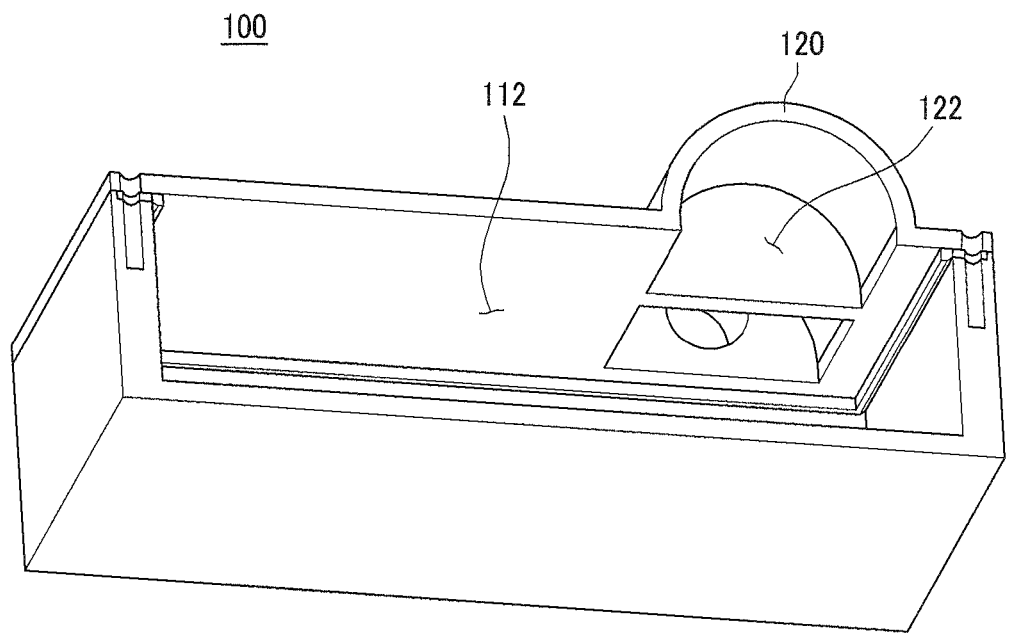
FIG. 3 is a perspective schematic view of an inner portion of the fuel tank shown in FIG. 2, with some elements omitted.

FIG. 3 is a perspective schematic view of an inner portion of the fuel tank 100 shown in FIG. 2, with some elements omitted.

As shown in FIG. 3, a reaction space 112 having a set (or predetermined) volume is provided in the body 110. In the reaction space 112 of the fuel tank 100, a metal hydride compound and a catalytic solution are mechanically and/or physically contacted. Then, hydrogen gas is generated by a hydrolysis reaction of the metal hydride compound.

The metal hydride compound used in the present exemplary embodiment may be composed of sodium borohydride ($NaBH_4$) as a main ingredient. During the chemical reaction between the metal hydride compound and the catalytic solution, hydrogen gas, vapor including water, and vapor including an alkaline material such as sodium and other materials are produced. In the present exemplary embodiment, the at least one hydrophobic porous membrane is disposed on the gas outlet 120 of the fuel tank 100 in order to eliminate (or block) the alkaline material of the vapor.

Figure 4:
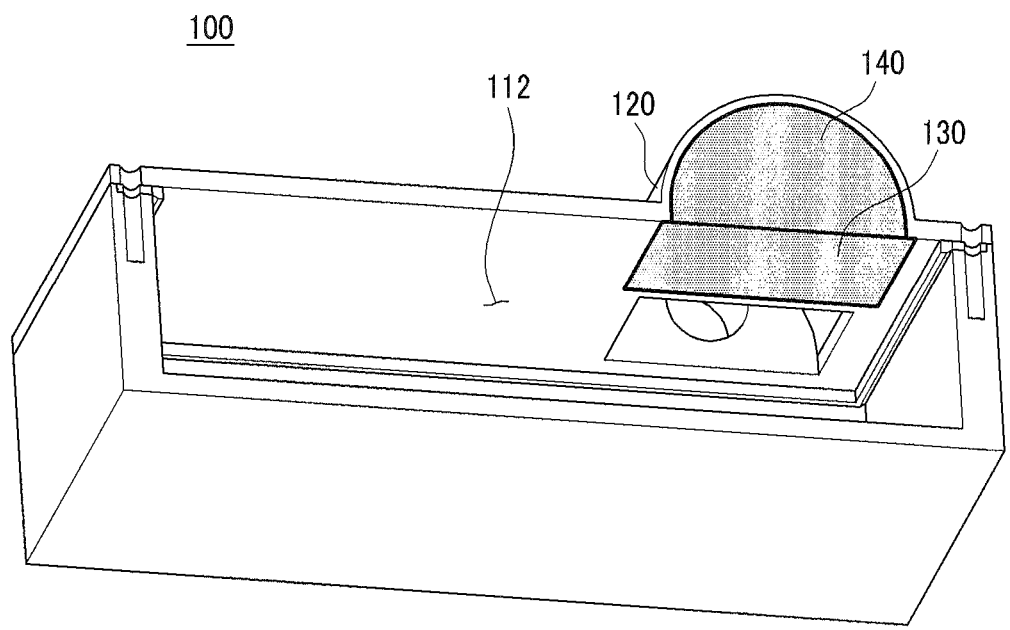
FIG. 4 is a perspective schematic view of the fuel tank in the state in which first and second hydrophobic porous membranes are disposed on a gas outlet of the fuel tank shown in FIG. 3.

FIG. 4 is a perspective schematic view of the fuel tank in the state in which first and second hydrophobic porous membranes 130 are disposed on the gas outlet 120 of the fuel tank 100 shown in FIG. 3.

As shown in FIG. 4, the gas outlet 120 protrudes toward the outside on an upper portion of the reaction space 112, and collects gas from the mixture of the gas and the liquid. In the exemplary embodiment, the first and second hydrophobic porous membranes 130 and 140, as the at least one hydrophobic porous membrane, are disposed on the gas outlet 120. In one embodiment of the present invention, the first hydrophobic porous membrane 130 is disposed on an inner side of the gas outlet 120, and the second hydrophobic porous membrane 140 is disposed on an outer side of the gas outlet 120. When viewed in the gas passage 40, the second hydrophobic porous membrane 140 is located between the first hydrophobic porous membrane 130 and the electricity generating unit 10 (refer to FIG. 1).

The first hydrophobic porous membrane 130 separates the gas and the liquid generated in the reaction space 112, and blocks an alkaline material of the vapor. Only the hydrogen gas and some vapors including water can be selected (or filtered) and supplied to the electricity generating unit 10. The standard of the selection (or filtration) depends on the pore size of the first hydrophobic porous membrane 130. The pores of the first hydrophobic porous membrane 130 have an average diameter of about 0.1 μm to about 0.5 μm. In one embodiment, if the pores of the first hydrophobic porous membrane 130 have an average diameter of less than 0.1 μm, the speed of separating the gas and the liquid is low, and the hydrogen gas cannot be properly supplied to the electricity generating unit 10. In another embodiment, if the pores of the first hydrophobic porous membrane 130 have an average diameter greater than 0.5 μm, the ability to block an alkaline material of the vapor is significantly deteriorated.

The second hydrophobic porous membrane 140 selectively blocks an alkaline material of the vapor. The pore size of the second hydrophobic porous membrane 140 is smaller than the pore size of the first hydrophobic porous membrane 130. Accordingly, even if a small amount of the alkaline material is passed through the first hydrophobic porous membrane 130, the second hydrophobic porous membrane 140 can block the small amount of alkaline material. In one embodiment of the present invention, the pores of the second hydrophobic porous membrane 140 have an average diameter of about 0.1 μm to about 0.2 μm. Under this condition, the small amount of the alkaline material can be blocked in a more effective manner.

Figure 5:
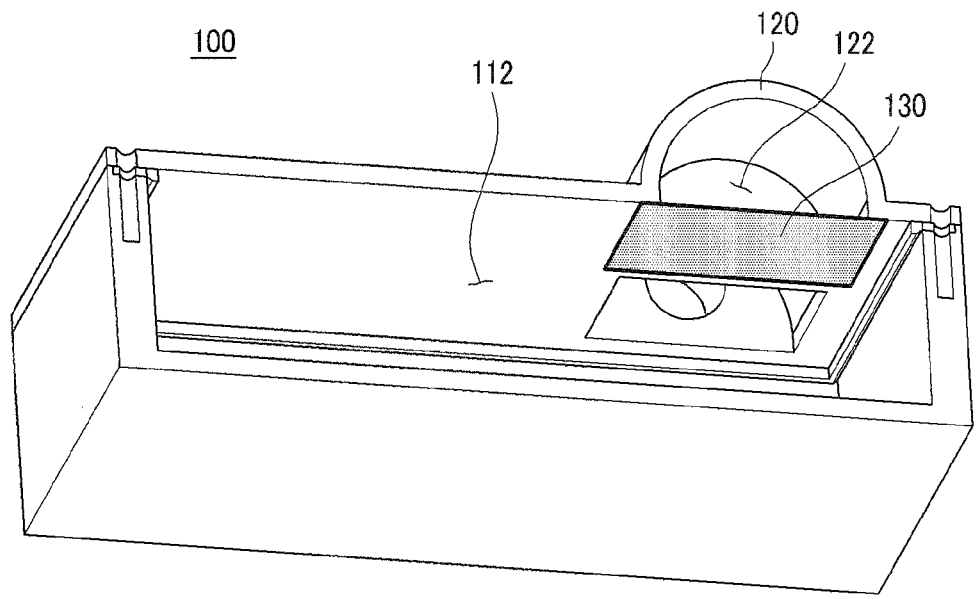
FIG. 5 is a perspective schematic view of the fuel tank, with the second hydrophobic porous membrane shown in FIG. 4 omitted.

FIG. 5 is a perspective schematic view of the fuel tank 100, with the second hydrophobic porous membrane 140 shown in FIG. 4 omitted. A water solution or an acid solution is filled in a discharging space 122 between the first hydrophobic porous membrane 130 and the second hydrophobic porous membrane 140.

As stated above, some amount of the alkaline material may pass through the first hydrophobic porous membrane 130, even though the amount is very small. The water solution or the acid solution dissolves the alkaline material of the vapor, thereby preventing (or blocking) the alkaline material from being supplied to the electricity generating unit 10. Also, since a surface of the first hydrophobic porous membrane 130 is covered with the water solution or the acid solution, the alkaline material cannot pass through the first hydrophobic porous membrane 130. The second hydrophobic porous membrane 140 prevents (or blocks) the water solution or the acid solution from being supplied to the electricity generating unit 10.

Figure 6:
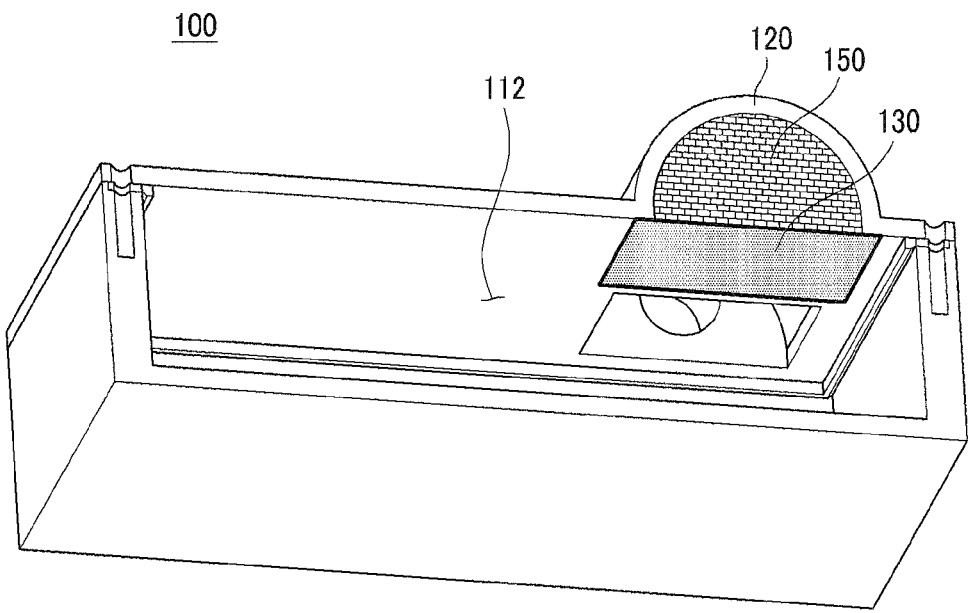
FIG. 6 is a perspective schematic view of the fuel tank in the state in which a water-soluble porous material is disposed in a discharging space of a gas outlet shown in FIG. 5.

FIG. 6 is a perspective schematic view of the fuel tank 100 in a state in which a water-soluble porous material is disposed in a discharging space of the gas outlet 120 shown in FIG. 5.

As shown in FIG. 6, a porous material 150 that absorbs the water solution or the acid solution is disposed in the discharging space 122 of the gas outlet 120. The porous material 150 maintains the absorption state, like a sponge, and a plurality of pores having a set (or predetermined) average diameter (for example 5 μm) are formed thereon. The porous material 150 is located behind the first hydrophobic porous membrane 130, and dissolves the alkaline material having passed through the first hydrophobic porous membrane 130. Accordingly, the porous material 150 prevents (or blocks) the alkaline material such as sodium from being supplied to the electricity generating unit 10. Since the porous material 150 is disposed in the state in which the solution is dissolved therein, the second hydrophobic porous membrane 140 may not be necessarily included.

Figure 7:
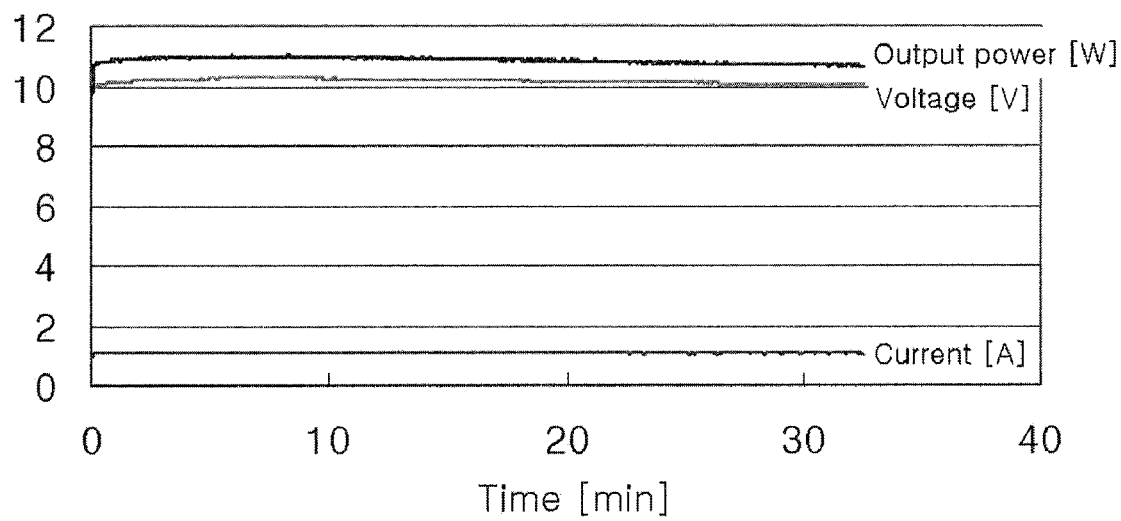
FIG. 7 is a graph showing results of generation of electrical energy in a fuel cell according to an exemplary embodiment of the present invention.
Figure 8:
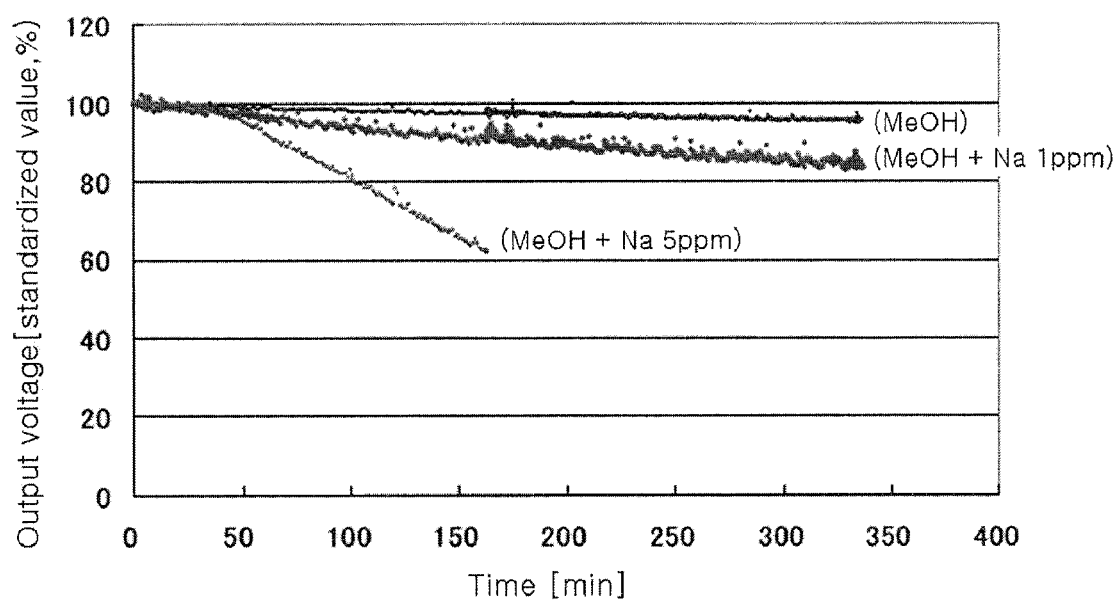
FIG. 8 is a graph showing effects of sodium in conventional fuel cell systems.

FIG. 7 is a graph showing results of generating electrical energy in a fuel cell according to an exemplary embodiment of the present invention.

The fuel cell system of the present exemplary embodiment was subjected to experiment under the following conditions. A mixture of the metal hydride compound and the catalytic solution used as a fuel was composed of sodium borohydride ($NaBH_4$) at 20 weight %, sodium hydroxide at 1 weight %, ethylene glycol at 1 weight %, and water ($H_2O$) at 78 weight %. A first hydrophobic porous membrane (e.g., the first hydrophobic porous membrane 130) and a second hydrophobic porous membrane (e.g., the second hydrophobic porous membrane 140) were sequentially disposed in a gas outlet of a fuel tank. The pores of the first hydrophobic porous membrane had an average diameter of 0.2 μm, and the pores of the second hydrophobic porous membrane had an average diameter of 0.1 μm.

The output power, the voltage, and the current of the electrical energy generated from the fuel cell system of the present exemplary embodiment were measured and are illustrated in FIG. 7. Referring to FIG. 7, in the fuel cell system of the present exemplary embodiment, the output power, the voltage, and the current were substantially uniform without any large change as time passed. That is, it can be seen that the fuel cell system can generate electrical energy stably, unlike the conventional fuel cell system. From the results of the experiment, it can be expected that the alkaline material such as sodium can be effectively eliminated in the fuel cell system of the present exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel cell system comprising:
   at least one hydrogen supplier for generating hydrogen gas from a fuel and for supplying the hydrogen gas through at least one gas passage;
   at least one electricity generator for generating electrical energy by reacting the hydrogen gas supplied from the at least one hydrogen supplier with an oxidizing agent gas;
   at least one hydrophobic porous membrane on the at least one gas passage, wherein the at least one hydrophobic porous membrane comprises a first hydrophobic porous membrane on an inner side of the at least one gas passage, and a second hydrophobic porous membrane on an outer side of the at least one gas passage between the first hydrophobic porous membrane and the at least one electricity generator, and a pore size of the first hydrophobic porous membrane is larger than a pore size of the second hydrophobic porous membrane;
   a water solution in a discharging space between the first hydrophobic porous membrane and the second hydrophobic porous membrane; and
   a porous material for absorbing the water solution in the discharging space between the first hydrophobic porous membrane and the second hydrophobic porous membrane.

2. The fuel cell system of claim 1, wherein
the pores of the first hydrophobic porous membrane have an average diameter of about 0.1 µm to about 0.5 µm.

3. The fuel cell system of claim 2, wherein
the pores of the second hydrophobic porous membrane have an average diameter of about 0.1 µm to about 0.2 µm.

4. The fuel cell system of claim 1, wherein
the fuel comprises a metal hydride compound, and
the at least one hydrogen supplier generates the hydrogen gas by a hydrolysis reaction of the metal hydride compound.

5. The fuel cell system of claim 4, wherein
the metal hydride compound comprises sodium borohydride (NaBH$_4$).

6. The fuel cell system of claim 1, wherein
the at least one hydrogen supplier comprises at least one fuel tank for generating the hydrogen gas and discharging the hydrogen gas through at least one gas outlet of the at least one fuel tank, and
the at least one hydrophobic porous membrane is on the at least one outlet of the at least one fuel tank where the at least one gas passage is connected.

7. A fuel tank providing hydrogen gas used for an electrochemical reaction of a fuel cell system, comprising:
   at least one body;
   at least one reaction space in the at least one body and for generating hydrogen gas by a hydrolysis reaction between a fuel and a solution;
   at least one gas outlet on the at least one body and through which the hydrogen gas is discharged; and
   at least one hydrophobic porous membrane on the at least one gas outlet, wherein the at least one hydrophobic porous membrane comprises a first hydrophobic porous membrane on an inner side of the at least one gas outlet, and a second hydrophobic porous membrane on an outer side of the at least one gas outlet, and a pore size of the first hydrophobic porous membrane is larger than a pore size of the second hydrophobic porous membrane;
   a water solution in a discharging space between the first hydrophobic porous membrane and the second hydrophobic porous membrane; and
   a porous material for absorbing the water solution in the discharging space between the first hydrophobic porous membrane and the second hydrophobic porous membrane.

8. The fuel tank of claim 7, wherein
the at least one gas outlet is on an upper portion of the at least one reaction space.

9. The fuel tank of claim 7, wherein
the pores of the first hydrophobic porous membrane have an average diameter of about 0.1 µm to about 0.5 µm.

10. The fuel tank of claim 7, wherein
the pores of the second hydrophobic porous membrane have an average diameter of about 0.1 µm to about 0.2 µm.

11. The fuel tank of claim 7, wherein
the fuel comprises a metal hydride compound.

12. The fuel tank of claim 11, wherein
the metal hydride compound comprises sodium borohydride (NaBH$_4$).

13. A fuel cell system comprising:
   at least one hydrogen supplier for generating hydrogen gas from a fuel and for supplying the hydrogen gas through at least one gas passage;
   at least one electricity generator for generating electrical energy by reacting the hydrogen gas supplied from the at least one hydrogen supplier with an oxidizing agent gas;
   at least one hydrophobic porous membrane on the at least one gas passage, wherein the at least one hydrophobic porous membrane comprises a first hydrophobic porous membrane on an inner side of the at least one gas passage, and a second hydrophobic porous membrane on an outer side of the at least one gas passage between the first hydrophobic porous membrane and the at least one electricity generator;
   an acid solution in a discharging space between the first hydrophobic porous membrane and the second hydrophobic porous membrane; and
   a porous material for absorbing the acid solution in the discharging space between the first hydrophobic porous membrane and the second hydrophobic porous membrane.

* * * * *